Patented Nov. 19, 1946

2,411,225

UNITED STATES PATENT OFFICE 2,411,225

3,4-DIBROMOTETRAHYDROTHIOPHENE

Wilbur I. Patterson, Chagrin Falls, and Joseph V. Karabinos, Columbus, Ohio, assignors, by mesne assignments, to Wyeth Incorporated, Philadelphia, Pa., a corporation of Delaware No Drawing. Application October 28, 1942, Serial No. 463,702

4 Claims. (Cl. 260—329)

This invention relates to the synthesis of a compound with the ring structure of biotin (vitamin H) and more particularly to an intermediate of such synthesis.

Several methods of approach to the synthesis of biotin have been used and in the present case the intermediate disclosed herein has been isolated as a step of the approach through dibromotetrahydrothiophene. In its broadest sense the invention consists in reacting butadiene with bromine in chloroform to form 1,2,3,4-tetrabromobutane which tetrabromobutane thereafter was used to form 3,4-dibromotetrahydrothiophene, this latter compound being an intermediate in the synthesis of biotin.

As an illustrative example of the preparation of this intermediate the following is given:

1,2,3,4-tetrabromobutane

In a suitable vessel a solution of 204 cc. (650 g.) of bromine in 500 cc. of chloroform was placed and butadiene bubbled into said solution until the bromine was decolorized. The solution containing the crystals of tetrabromobutane was filtered and the crystals washed with chloroform and dried. The filtrate was evaporated to a fraction of its original volume and then cooled. The total yield of tetrabromobutane thus obtained was approximately 423 grams.

3,4-dibromotetrahydrothiophene 80 grams of tetrabromobutane were dissolved in a minimum amount of hot ethyl alcohol or approximately 480 cc. 28 grams of potassium sulphide which had previously been dissolved in 120 cc. of water were added slowly and the mixture refluxed for four hours. The resinous insoluble material was filtered and the filtrate cooled in an ice bath in order that all or nearly all of the unchanged starting material still present will separate out. The material was filtered and the filtrate evaporated to remove the alcohol. The residue was suspended in water and distilled with steam. The distillate which contains a light yellow oil, was extracted several times with ether, the ether dried with sodium sulphate and evaporated in vacuo on a water bath using a water aspirator. The resultant residue was distilled at 10 mm. and two fractions collected, the first fraction boiling at 104 to 106° at 10 mm. and the second fraction at 118 to 123° at 10 mm. The second fraction yielded crystals of tetrabromobutane on cooling and was discarded. The first fraction was redistilled and analyzed: Calculated for $C_4H_6Br_2S$: C, 19.53; H, 2.44.

The reaction is indicated by the following formula:

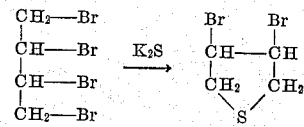

While the specific example discloses the preferred use of potassium sulfide, the formation of 3,4-dibromotetrahydrothiophene may be carried out by reacting 1,2,3,4-tetrabromobutane with any alkali metal sulfide or alkaline earth metal sulfide.

What we claim is:

1. 3,4-dibromotetrahydrothiophene.

2. The process of preparing 3,4-dibromotetrahydrothiophene which consists in reacting a solution of 1,2,3,4-tetrabromobutane in ethyl alcohol with an aqueous solution of a sulphide selected from the group consisting of alkali and alkaline earth metal sulphides, refluxing said mixture, filtering the resultant undesirable solid, removing the alcohol, distilling the residue, extracting the resultant distillate, treating the extracted material with sodium sulphate and distilling said extracted material.

3. The process of preparing 3,4-dibromotetrahydrothiophene comprising reacting 1,2,3,4-tetrabromobutane with a sulphide selected from the group consisting of alkali and alkaline earth metal sulphides, and separating the resulting 3,4-dibromotetrahydrothiophene from the reaction mixture.

4. The process of preparing 3,4-dibromotetrahydrothiophene comprising reacting 1,2,3,4-tetrabromobutane with potassium sulfide and separating the resulting 3,4-dibromotetrahydrothiophene from the reaction mixture.

WILBUR I. PATTERSON.
JOSEPH V. KARABINOS.